March 14, 1961     T. G. OATES     2,974,992
DOWEL AND METHOD OF INSERTING SAME
Filed Jan. 28, 1958
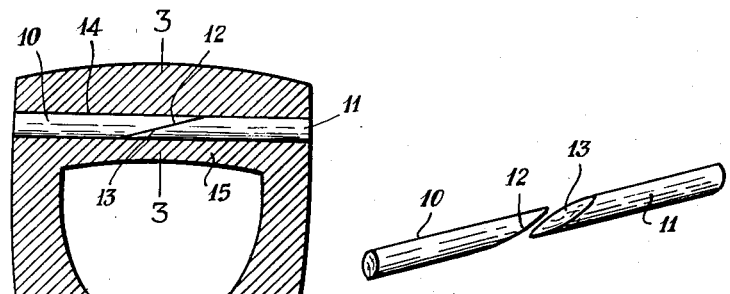
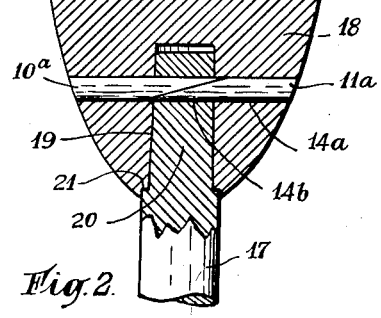
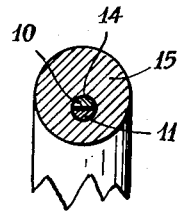
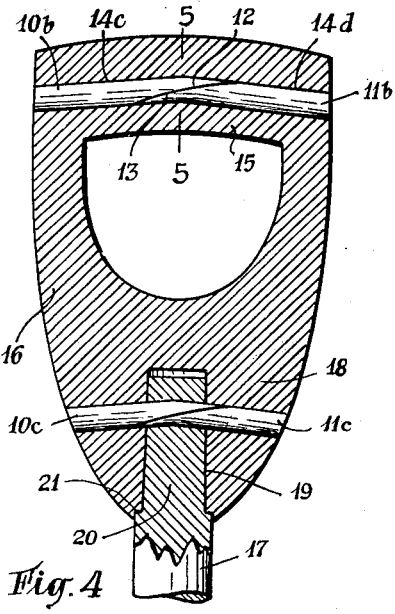
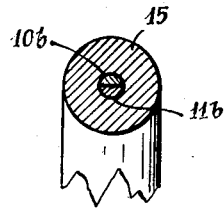

United States Patent Office 2,974,992
Patented Mar. 14, 1961

2,974,992

DOWEL AND METHOD OF INSERTING SAME

Thomas Geoffrey Oates, Worksop, England, assignor to Oates Limited, Worksop, England, a company of Great Britain and Northern Ireland Filed Jan. 28, 1958, Ser. No. 711,658

Claims priority, application Great Britain Feb. 1, 1957

7 Claims. (Cl. 294—57)

This invention relates to a dowel made of wood and the method of inserting same for use in securing the joint between two members of wood or for strengthening or reinforcing an article made of wood.

An object of the invention is to provide an improved dowel comprised of two like members each having one oblique end face and the oblique end faces of said two members constituting meeting ends of the two members when inserted at opposite ends of and into a dowel-receiving hole for said oblique end faces one to overlie the other whereby the two members occupy said dowel-receiving hole to function therein as a single dowel.

A further object of the invention is to provide that where circumstances desire or dictate that one length of the dowel-receiving hole be at an angle to the remaining length, the improved dowel of this invention will effectively function as a single dowel by reason of the oblique faces at the meeting ends of the two dowel members overlying one another at the junction of the lengths of said dowel-receiving hole in spite of said dowel members being disposed at an angle to one another.

It is also a further object of this invention to secure a D-type handle of a spade, fork and similar implement to a separately formed haft by providing the basal part of said handle with haft-receiving socket at its vertical axis, inserting into said socket the spigot end of a haft and securing said spigot end in said socket with an adhesive medium together with a dowel passing through the handle and spigot, said dowel comprising two like members meeting one another in said spigot, the meeting ends of said dowel members having oblique faces the one overlying the other.

It is yet a further object of this invention to provide a D-type handle having a hand-grip and a reinforcing dowel extending longitudinally through said hand-grip, said dowel comprising two like members meeting one another within said hand-grip and the meeting ends of said dowel members having oblique faces the one overlying the other.

These and other objects will be apparent from the following description in which reference is had to the accompanying drawings.

In the drawings:

Fig. 1 is a perspective view of a dowel made in accordance with this invention.

Fig. 2 is an elevation, partly in longitudinal section of the wooden handle and haft of a horticultural implement.

Fig. 3 is a cross section on the line 3—3 of Fig. 2.

Fig. 4 is a similar view to Fig. 2 of an alternative construction of wooden handle to that depicted in Fig. 2.

Fig. 5 is a cross section on the line 5—5 of Fig. 4.

As will be seen in Fig. 1 the wooden dowel of the present invention comprises two like dowel pieces 10, 11 for insertion in opposing relation to one another into an open-ended dowel-receiving bore, said pieces being formed by severing, medially to its ends, a single length of wood of cylindrical form by an oblique cut to provide said dowel pieces with inner meeting ends of elliptical cross section forming two oblique matching plane faces 12, 13 respectively and with remote ends of circular cross section.

The two dowel pieces, 10, 11 are adapted to be inserted one from each end, in the straight dowel-receiving bore 14 of the hand-grip 15 of a handle 16 as shown in Fig. 2, so that their oblique plane faces are disposed in coplanar relation within said bore and opposing endwise pressure is applied to the remote end faces of said dowel pieces whereby the opposing oblique plane faces 12, 13 are brought together into concealed co-planar abutment throughout the cross sectional area of the dowel and within the receiving bore therefor remote from the ends thereof, the two pieces completely occupying said bore with their remote circular ends exposed terminating at opposite ends of the dowel-receiving bore 14 to function substantially as a single dowel would do.

When the two members 10, 11 of the dowel are inserted under pressure one from each end, in the straight dowel-receiving hole 14 of the hand-grip 15 of a handle 16 as shown in Fig. 2, said oblique faces overlie one another so that the two members 10, 11 completely occupy the dowel-receiving hole 14 to function substantially as a single dowel would do.

Adhesive medium, for example, glue is applied to the dowel-receiving bore and, if desired, as a coating to the two dowel pieces and owing to said two dowel pieces passing inwardly into the dowel-receiving bore from opposite ends thereof until they meet one another, the adhesive medium is trapped therein and caused effectively to secure the two dowel pieces to the wall of the dowel-receiving bore and to one another at their abutting oblique plane faces over an area greater than the normal cross sectional area of the dowel.

The reason for inserting the two-piece dowel in the hand-grip 15 is to strengthen or reinforce it for the reason that, since said hand-grip is an integral part of the handle 16 and the grain of the wood consequently runs transversely of said hand-grip, splitting and breaking away of the hand-grip often occurs due to its alternately swelling and shrinking under climatic conditions.

Reinforcement of the hand-grip 15 by the dowel 10, 11 will securely hold said hand-grip in position even if splitting thereof is not prevented.

As is also shown in Fig. 2, the two-piece dowel of this invention is used for interlocking the handle 16 to a separately formed haft 17.

It is here convenient to point out that, for the sake of economy in manufacture and for other reasons, it is desirable for the handles 16 to be cut and shaped from a solid block of wood as preformed handles and for the hafts to be cut and shaped from separate blocks of wood also as preformed hafts and thus effect economy in the use of wood as compared with the usual method of cutting out the handles and hafts each as an integral unit.

The handle 16, therefore, is bored in the lower basal part 18 thereof to provide a socket 19 which may be parallel, or as is shown, of inwardly tapering form to receive the complementary spigot 20 at the upper end of the haft 17, the orifice of said socket being rabbeted as seen at 21 to accommodate a very short length of the normal diameter of the haft.

Preferably the spigot 20 of the haft 17 is secured to the socket 19 by an adhesive medium such as glue and is slightly less in length than said socket to ensure proper fitment in the case of the taper socket and spigot shown.

The spigot 20 is locked to the socket by the two dowel pieces 10a, 11a entered into and fully occupying coinciding dowel-receiving bores 14a, 14b in the handle 16 and spigot 20 respectively and in parallel with the remote faces of the handle.

One advantage of the two-piece dowel is that when the two pieces 10, 11 thereof are inserted at opposite ends of the dowel-receiving bore therefor after an appropriate amount of adhesive medium has first been inserted said dowel-receiving bore is not denuded of the adhesive medium by being pushed out as is sometimes the case where a single dowel is used. Instead, adhesive medium is well retained within the dowel-receiving bore and enough of it is trapped between the opposing oblique plane faces of the two dowel pieces to ensure securement together of said pieces at their meeting ends in addition to their being secured to the wall of the dowel receiving bore.

Another advantage of the two-piece dowel is that it can be used equally efficiently in a dowel-receiving bore comprised of two conjoined lengths disposed at an angle to one another.

An example of such use is illustrated in Fig. 4 where the two lengths of dowel-receiving bore 14c, 14d are upwardly inclined inwardly to meet at approximately the centre of the hand-grip 15 and thus avoid weakening said hand-grip as the straight dowel-receiving bore 14 of Fig. 2 is likely to do by coming near to the lower boundary of said hand-grip and cause the latter to break away.

By using two dowel pieces 10b, 11b of equal length the opposing oblique plane faces thereof will abut one another at the junction of the two lengths of the dowel-receiving bore 14c, 14d as seen in Fig. 4.

As will also be seen in Fig. 4, the abutting opposing oblique faces have become somewhat deformed owing to the angle formed at the junction of the two lengths of dowel-receiving bore 14c, 14d, such deformation enabling the two dowel pieces 10b, 11b to fully occupy said two lengths of bore. It will be obvious that the deformation of the meeting ends of the two dowel pieces is permissible owing to their tapering formation providing feather edge extremities which will be easily bent to follow the angle at the junction of the two lengths of the dowel-receiving bore 14c.

For locking the spigot 20 to the socket 19 of the handle 16 of Fig. 4 the same principle of two dowel members 10c, 11c is employed.

With separately formed handles and hafts it is possible to arrange for the haft to be fitted to the handle with the "lay" of the grain of the wood of the haft disposed in a different relation to which it would be disposed if said haft were integral with the handle. In this connection where the haft requires to be bent at its end for receiving a blade or other tool, it is sometimes desirable that what is termed the "flower" of the grain, where there are thin surface layers, is so disposed that bending of the haft does not too readily cause "lifting" or tearing of those surface layers.

What I claim is:

1. A D-type handle for a spade, fork and similar tool, a socket in the basal end of the handle at the longitudinal axis thereof and a haft fitted to the handle, a spigot on said haft entered into said socket and a dowel passing through said basal part of the handle and said spigot in parallel with the broad exposed faces of the handle, said dowel comprising a pair of like dowel pieces having oblique meeting faces in close overlying engagement within the spigot and said dowel pieces being disposed at an angle to one another with their angle of inclination extending upwardly and inwardly of the handle said dowel pieces being joined to each other, to the spigot and the handles by adhesive.

2. A dowelled non-metallic structure having a dowel-receiving bore of substantially constant circular cross section and a non-metallic two piece dowel completely filling said bore, said dowel pieces having deformable oblique meeting ends of like elliptical cross section in concealed co-planar abutment one with the other within said bore remote from the ends thereof and said dowel pieces having remote ends of circular cross section complementary to the cross section of the dowel-receiving bore exposed at the opposite ends of said bore.

3. A dowelled non-metallic structure having a dowel-receiving bore of substantially constant circular cross section, said bore being substantially in two conjoined haft lengths at an angle to one another and meeting together at their inner ends and a non-metallic dowel completely filling said dowel-receiving bore, said dowel comprising two like dowel pieces, one in each half length of bore, having deformed meeting ends of like elliptical cross section in concealed substantially co-planar abutment one with the other at the junction of said bore lengths, said dowel pieces having remote ends of substantially circular cross section terminating at the outer ends of the bore lengths, and said dowel pieces being joined each to the other and to the wall of the bore.

4. A handle for a spade, fork and similar tool having a transverse handgrip with a dowel-receiving bore of constant circular cross section extending substantialy longitudinally of said handgrip and a two piece reinforcing dowel completely filling said bore, said dowel pieces having deformable meeting ends of like elliptical cross section in concealed co-planar abutment one with the other within said bore remote from the ends thereof and said dowel pieces having remote ends of circular cross section complementary to the cross section of the dowel-receiving bore terminating at the opposite ends of said bore, and said dowel pieces being joined each to the other and to the wall of said bore by adhesive.

5. The method of forming in a structure a non-metallic dowell assembly which comprises forming in said structure an open-ended dowel-receiving bore of constant diameter, constructing a non-metallic cylindrical dowel in two component pieces sufficient to fully occupy said bore, said dowel pieces each having its one end of elliptical cross section forming an oblique plane face and its other end of circular cross section, charging the dowel-receiving bore with adhesive medium sufficient to coat the wall of said bore and the oblique plane faces of said dowell pieces, inserting the two component dowell pieces into the bore one at each end thereof with said oblique plane faces in parallel relation whereby said adhesive medium is trapped in said bore, applying opposing endwise pressure to the remote ends of said dowel pieces sufficient to bring the oblique plane faces of said dowell pieces into concealed co-planar abutment within the bore remote from the ends thereof whereby said dowel pieces adhere each to the other and to the wall of said dowel-receiving bore so as to function as a single reinforcing dowel substantially integral with the structure.

6. The method of forming in a structure a non-metallic dowel assembly which comprises forming in said structure an open-ended dowel-receiving bore of substantially constant diameter in two conjoined cylindrical lengths at an angle to one another, constructing a non-metallic cylindrical dowel in two component pieces sufficient to fully occupy said bore, said dowel pieces each having its one end of elliptical cross section, forming an oblique plane face and its other end of circular cross section, charging the dowel-receiving bore with adhesive medium sufficient to coat the wall of said bore and the oblique plane faces of said dowel pieces, inserting the two dowel pieces into the bore one at each end thereof with said oblique plane faces in parallel relation whereby said adhesive is trapped in said bore, applying opposing endwise pressure to the remote ends of said dowel pieces sufficient to bring the oblique plane faces of said dowel pieces into concealed co-planar abutment at the junction of the conjoined bore lengths whereby said dowel pieces adhere each to the other and to the wall of said dowel-receiving bore so as to function as a single reinforcing dowel substantially integral with the structure.

7. In a handle for a spade, fork and similar tool having a curved transverse hand-grip and a dowel-receiving hole extending substantially longitudinally of and throughout said hand-grip and accommodating a dowel from end-to-end of said dowel-receiving hole, said dowel-receiving hole being substantially in two conjoined half lengths disposed at an angle to one another and meeting together at their inner ends whereby said hole is substantially centered relative to said curved hand-grip, and said dowel comprising a pair of like members one in each hole length and meeting one another at the junction of said hole lengths, the meeting ends of said dowel members being oblique matching faces in close overlying engagement one with the other over an area greater than the cross sectional dimension of the dowel-receiving hole, said dowel members being joined each to the other and to the wall of said hole by adhesive.

References Cited in the file of this patent

UNITED STATES PATENTS

| | | |
|---|---|---|
| 148,276 | Allen | Mar. 10, 1874 |
| 715,135 | Parkes | Dec. 2, 1902 |
| 1,337,807 | Wightman | Apr. 20, 1920 |
| 1,369,995 | Webster | Mar. 1, 1921 |
| 2,389,464 | Snyder | Nov. 20, 1945 |
| 2,763,506 | Denker | Sept. 18, 1956 |
| 2,777,641 | Snyder | Jan. 15, 1957 |

FOREIGN PATENTS

| | | |
|---|---|---|
| 233,098 | Great Britain | May 7, 1925 |
| 153,491 | Sweden | Feb. 21, 1956 |